(12) United States Patent
Wacker et al.

(10) Patent No.: US 10,473,290 B2
(45) Date of Patent: Nov. 12, 2019

(54) MOTOR VEHICLE COMPONENT

(71) Applicant: WKW Erbsloeh Automotive GmbH, Wuppertal (DE)

(72) Inventors: Andreas Wacker, Solingen (DE); Bernd Fausten, Velbert (DE); Michael Hoinka, Heiligenhaus (DE)

(73) Assignee: WKW Erbsloeh Automotive GmbH, Wuppertal (DE)

(*) Notice: Subject to any disclaimer, the term of this patent is extended or adjusted under 35 U.S.C. 154(b) by 0 days.

(21) Appl. No.: 15/832,129

(22) Filed: Dec. 5, 2017

(65) Prior Publication Data

US 2018/0172239 A1 Jun. 21, 2018

(30) Foreign Application Priority Data

Dec. 21, 2016 (DE) .................... 20 2016 007 703 U

(51) Int. Cl.
| | |
|---|---|
| *F21V 7/00* | (2006.01) |
| *F21S 4/20* | (2016.01) |
| *F21S 41/33* | (2018.01) |
| *F21S 41/37* | (2018.01) |
| *B60Q 1/24* | (2006.01) |
| *B60Q 1/26* | (2006.01) |
| *F21V 7/09* | (2006.01) |
| *F21V 7/22* | (2018.01) |
| *B60R 11/00* | (2006.01) |

(52) U.S. Cl.
CPC ............... *F21V 7/005* (2013.01); *B60Q 1/24* (2013.01); *B60Q 1/2696* (2013.01); *F21S 4/20* (2016.01); *F21S 41/33* (2018.01); *F21S 41/37* (2018.01); *F21V 7/0008* (2013.01); *F21V 7/09* (2013.01); *F21V 7/22* (2013.01); *B60R 2011/004* (2013.01)

(58) Field of Classification Search
CPC .......... G02B 6/0001; B60Q 1/26; B60Q 1/24; B60Q 1/2696; F21V 7/005; F21V 7/0008; F21V 7/09; F21V 7/22; F21S 4/20; F21S 41/33; F21S 41/37
USPC .................................................. 362/493, 459
See application file for complete search history.

(56) References Cited

U.S. PATENT DOCUMENTS

| | | | |
|---|---|---|---|
| 9,033,565 B2 * | 5/2015 | Pfeil ...................... | G02B 6/001 362/459 |
| 2012/0031939 A1 | 2/2012 | Jutila et al. | |

(Continued)

FOREIGN PATENT DOCUMENTS

| | | |
|---|---|---|
| DE | 9315848 U1 | 11/1994 |
| DE | 19948475 A1 | 4/2001 |

(Continued)

*Primary Examiner* — Daniel A Hess
(74) *Attorney, Agent, or Firm* — Oppedahl Patent Law Firm LLC

(57) ABSTRACT

A motor vehicle component consisting of a metal profile element and a lighting element. The profile element has a channel extending in the longitudinal direction of the profile with an externally accessible opening extending in the longitudinal direction of the profile. The lighting element serves to produce a strip of light radiating in the longitudinal direction of the profile, and is arranged in the channel of the profile element so as to be concealed behind an outer surface of the profile element so that the radiated light does not arrive directly at the outside, but instead is reflected outward by a reflecting surface of the profile element.

20 Claims, 3 Drawing Sheets

(56) References Cited

U.S. PATENT DOCUMENTS

2013/0135880 A1     5/2013   Michie et al.
2016/0082880 A1*   3/2016   Co ...................... B60Q 1/2611
                                                            701/2

FOREIGN PATENT DOCUMENTS

| DE | 10105167 A1 | 8/2002 |
| --- | --- | --- |
| DE | 10336901 B3 | 5/2005 |
| DE | 202009009489 U1 | 10/2009 |
| DE | 202010002446 U1 | 5/2010 |
| DE | 102011080578 A1 | 3/2012 |
| DE | 202014102150 U1 | 5/2014 |
| DE | 102014220630 A1 | 4/2016 |
| DE | 202016007703 U1 | 1/2017 |
| DE | 202017106356 U1 | 10/2017 |
| JP | 2003285128 A | 10/2003 |
| JP | 2007253928 A | 10/2007 |
| KR | 101635561 B1 | 7/2016 |
| WO | 1995011144 A1 | 4/1995 |

\* cited by examiner

MOTOR VEHICLE COMPONENT

BACKGROUND OF THE INVENTION

The invention concerns a motor vehicle component consisting of a metal profile element, which component includes a lighting element and which preferably is mounted on the body or the roof of the motor vehicle.

Already known from patent documents DE 10 2011 080,578 A1, DE 10 2014 220,630 A1, and US 2013/0,135,880 A1 are motor vehicle components, as, for example, roof luggage carrier arrangements, that contain a light-emitting component, for example, a flexible fluorescent lamp or an optical waveguide. An optical waveguide is surrounded by a jacket in this context. Such lighting elements can achieve an illumination of designated areas of the motor vehicle or can achieve an additional decorative effect by radiating outward. Light-emitting elements in the form of optical waveguides are very sensitive to external influences. UV rays can lead to accelerated aging of the plastic jacket. Droplets of water on the optical waveguide are visible to the observer as dark spots. The smallest scratches, which are caused by, for example, the brushes of a carwash, are visible to the observer as bright spots on the optical waveguide, which represents an optical defect. Moreover, particles of dirt can also adversely affect the action of the light-emitting elements.

BRIEF SUMMARY OF THE INVENTION

The object of the present invention is to provide an improved motor vehicle component whose optical action is less sensitive to external influences.

This object is attained by a motor vehicle component with the features described below. Advantageous embodiments of the present invention are also described below.

The novel motor vehicle component includes a metal profile element and a lighting element. The metal profile element is, in particular, an extruded profile made of aluminum or an aluminum alloy. Starting from a front profile end region, the profile element extends through a center profile region to a back profile end region, and has a channel extending in the longitudinal direction of the profile with an externally accessible opening extending in the longitudinal direction of the profile. The lighting element serves to produce a strip of light radiating in the longitudinal direction of the profile. This lighting element is held in the channel of the profile element, and can either be pushed into the channel at the end or can be pressed into the channel through the channel's opening. According to the present invention, the channel with the lighting element is arranged so as to be concealed behind an outer surface of the profile element. This means that the lighting element is not visible from outside when the motor vehicle component is installed. In a special manner, the light radiated by the lighting element does not arrive directly at the outside, but instead is reflected outward by a reflecting surface of the profile element. Such a reflecting surface is located opposite the opening of the channel, and extends along the opening of the channel in the longitudinal direction of the profile. This reflecting surface is oriented at an angle, namely such that the rays of light radiated by the lighting element strike the reflecting surface at an acute angle and are radiated outward by reflection. In this way, a narrow strip of light radiated in the longitudinal direction of the profile by the lighting element is visible from outside as a wide strip of light due to reflection when the motor vehicle component is installed. To this end, in especially advantageous manner the reflecting surface is wider than the width of the opening of the channel through which the rays of light emerge. Consequently, the strip of light radiated by the lighting element becomes wider when it is reflected at this reflecting surface.

In one advantageous embodiment, it is possible because of the invention to generate a strip of light along the metal profile element that is radiated laterally even though the lighting element is not visible from this outer surface, namely, is arranged so as to be concealed behind the outer surface and radiates the light vertically downward, for example. The reflecting surface provided on the profile element accomplishes the widening and redirection of the rays of light that have emerged from the lighting element. Of course, there can also be multiple reflecting surfaces for directing the light outward. Preferably, one reflecting surface is arranged opposite the opening of the channel.

The reflecting surface can have a flat surface. In the simplest manner, this is produced during extrusion of the metal profile element. The condition of the surface is then called mill finish. Even in this basic condition, the surface of the profile element can serve as a reflecting surface. Depending on the design of the profile element, the reflectivity of the surface of the reflecting surface can be increased or altered through a chemical or mechanical surface treatment. The reflectivity is increased by grinding, and mechanical or chemical polishing, resulting in a smooth, polished finish. Since grinding and polishing is a cost-intensive surface treatment, surface defects on the reflecting surface can also be remedied by a roughening process, for example, by means of abrasive blasting with ceramic or stainless steel particles. Another possibility for implementing the reflecting surface, namely for increasing the surface gloss of the reflecting surface without cost-intensive grinding and polishing, is by providing corrugation at the surface of the reflecting surface. Such corrugation is produced during extrusion of the profile element, so no additional process step is necessary. The peaks and valleys of the corrugation do not need to be reworked. Because of the peaks and valleys, the corrugations produce an increased reflectivity without any damage, scratches, or orange peel effect on the reflecting surface being visible to the observer.

Because of the provision of a reflecting surface, the lighting element can be placed in the channel behind the outer surface of the profile element in a protected manner. It is thus protected from external influences, as well as from moisture and dirt, which can lead to dark spots on the optical waveguide, but also from mechanical influences that can lead to scratches on the optical waveguide that appear as bright spots on the optical waveguide. Moreover, when an optical waveguide with a plastic jacket is used, it is advantageous that this is likewise arranged so as to be protected from UV light. In addition, the radiated effective area is increased by the provision of the reflecting surface.

The lighting element can be an LED strip or an electroluminescent cord or another light-emitting element. The lighting element can also be an optical waveguide that can take the form of a flexible cable with a plastic jacket or else can take the form of an injection molded part. As a general rule, the flexible cables have a polyethylene sleeve as the jacket for the light-guiding core. This core can consist of one or more optical fibers made of plastic or glass. In the case of an injection molded part, the dimensionally stable component is made of, for example, polymethyl methacrylate (PMMA). Such injection molded parts can have various cross-sections. The cross-sections of the channels in the profile element are matched to the cross-sections of these lighting elements so that the lighting element can be pushed or snapped into the channel. Depending on the shape of the lighting element, the channel on the profile element can have a different cross-section, for example a round, oval, rectangular or otherwise polygonal cross-section.

A method for use with an apparatus as described above would comprise the steps of providing power to the lighting element, having the rays of light strike the reflecting surface, and the rays of light being radiated out therefrom.

BRIEF DESCRIPTION OF THE SEVERAL VIEWS OF THE DRAWINGS

Various exemplary embodiments are described below on the basis of the drawings in order to explain the invention. The drawings show.

The implementations shown in FIG. 1 to FIG. 5 represent examples of the invention. The invention is not restricted to these implementations.

DETAILED DESCRIPTION OF THE INVENTION

Figure 1:
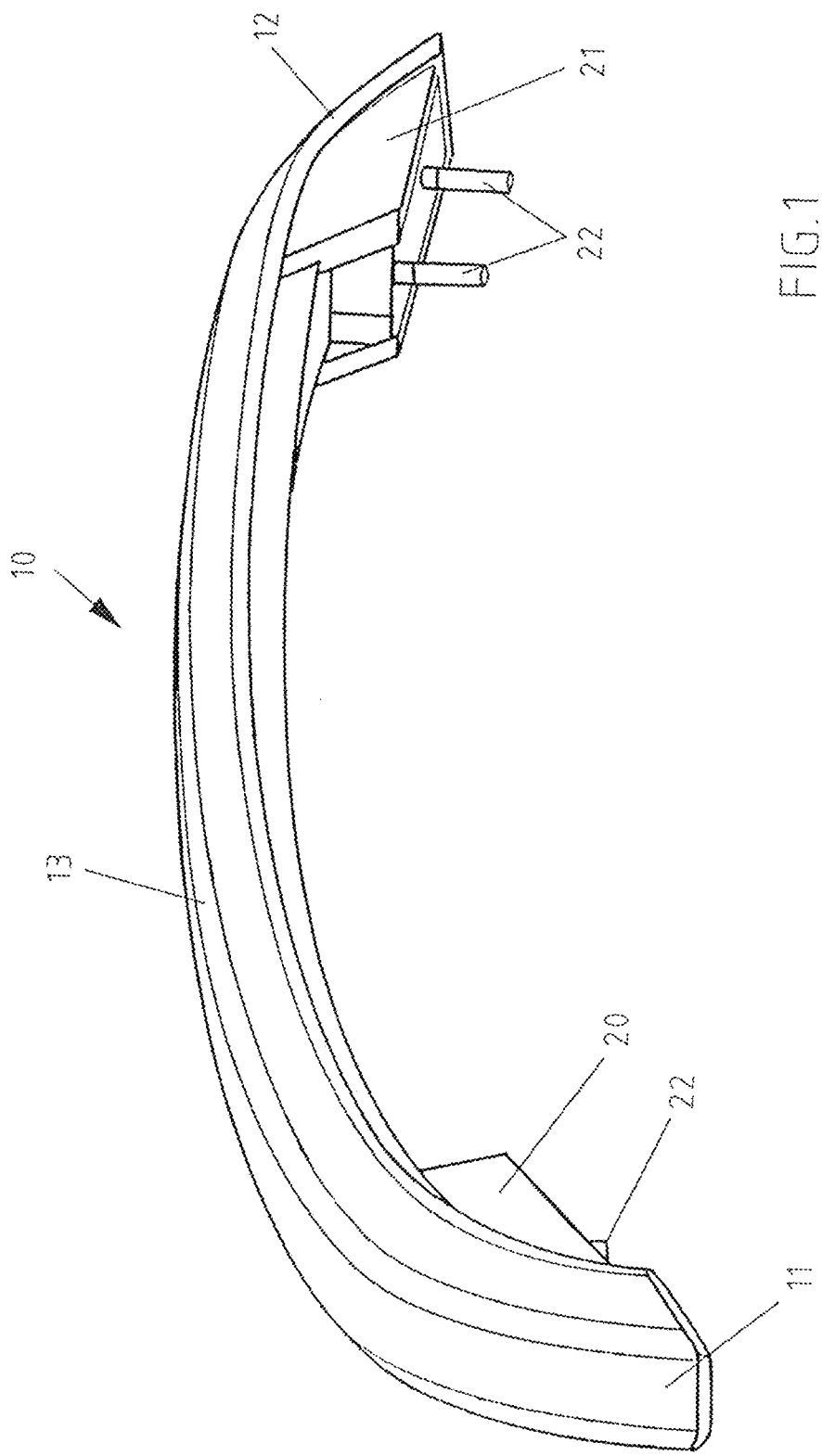
FIG. 1 a roof rack according to the invention in a perspective view.
Figure 2:
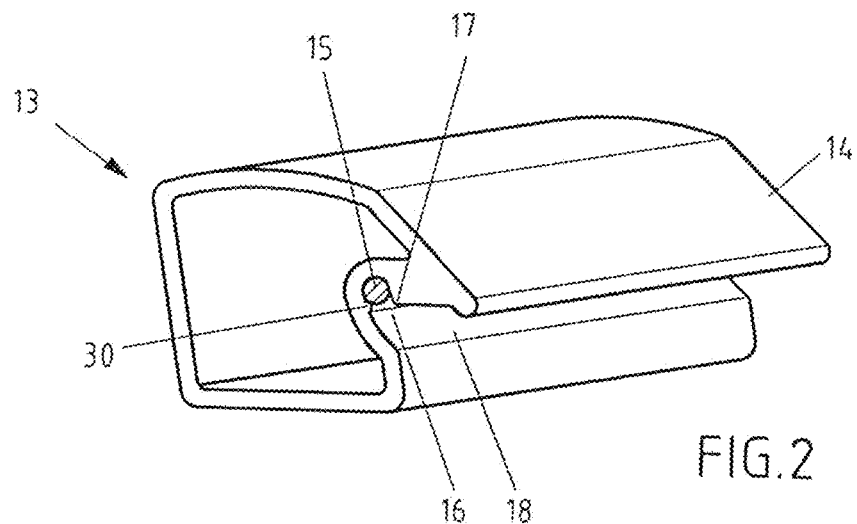
FIG. 2 a center profile region of the roof rack from FIG. 1 in a perspective view, FIG. 3 another center profile region of a roof rack in a perspective view, FIG. 4 another exemplary embodiment in cross-section, FIG. 5 another exemplary embodiment in cross-section.

FIG. 1 shows a motor vehicle component according to the invention. In this case, a roof rack. The latter comprises a metal profile element 10; in this case, an extruded aluminum profile that is bent after extrusion so that the front profile end region 11 and the back profile end region 12 can rest on the roof of the motor vehicle, and the result after installation is a roof rack raised on fixed supports. To mount the roof rack on the roof of the motor vehicle, mounting adapters 20, 21 are provided in the region of the front and back profile end regions 11, 12. Visible are the screws 22 projecting out of the mounting adapters 20, 21, which are inserted through openings in the roof surface and screwed to the motor vehicle from the inside. The lighting element 30 that is present is not visible. In order to show this element, a part of the center profile region 13 of said roof rack is shown in FIG. 2. The roof rack is a hollow profile. Behind the outer surface 14, which is located on the left-hand or right-hand outer surface of the motor vehicle and extends along said left-hand or right-hand outer surface of the motor vehicle when the roof rack is installed, a channel 15 is provided in a concealed fashion. Said channel 15 extends in the longitudinal direction of the profile. The lighting element 30 is placed in this channel 15. In FIG. 2, it is a flexible optical waveguide, which is drawn into the channel 15 like a weather strip.

It is held in this channel 15, since the opening 16 of the channel 15, which likewise extends in the longitudinal direction of the profile, prevents—by means of constrictions 17—the lighting element 30 from falling downward out of the channel. The lighting element 30 can radiate its light through the opening 16 of the channel 15. The rays of light fall in the form of a narrow strip of light on the reflecting surface 18 located at an angle across from the opening, and are deflected from here such that they radiate laterally outward from the roof rack. The light is injected into these optical waveguides at the ends, namely, by means of light-emitting diodes, wherein the light-emitting diodes are arranged in one or both profile end regions 11, 12. Depending on the size of the component, one light-emitting diode is sufficient, or else light-emitting diodes are provided at both ends of the optical waveguide. If, in contrast, the lighting element 30 is an electroluminescent cord, then the requisite inverter is placed in the profile end region 11, 12. With this arrangement, a roof rack is advantageously achieved where a wide strip of light is radiated laterally in the longitudinal direction of the roof rack, so that a strip of light of this nature can be perceived from both sides of the motor vehicle because of the arrangement of two roof rack components on the roof. This strip of light in this design is wider than the width of the opening 16 of the channel 15. In the example from FIG. 1, the width of the opening 16 from which the light emanates is 2.5 mm. The diameter of the lighting element 30 is 3 mm, and the width of the reflecting surface 18 is greater than the width of the opening 16, namely, 5 mm. The strip of light that is produced has a uniform light intensity. It is not adversely affected by flaws in the optical waveguide, such as, for example, bright spots due to scratches or dim spots due to drops of liquid or dirt, since the optical waveguide is located behind the outer surface 14 in a protected manner. Moreover, minor flaws in the optical waveguide are retouched by the reflecting surface. Advantageously, due to this novel arrangement, first of all the optical waveguide itself is protected, namely from mechanical and environmental influences, such as, e.g., moisture and UV rays. In addition, a uniform and larger effective area is achieved. In FIG. 2, the reflecting surface is a smooth, polished reflecting surface with an increased reflectivity.

Figure 3:
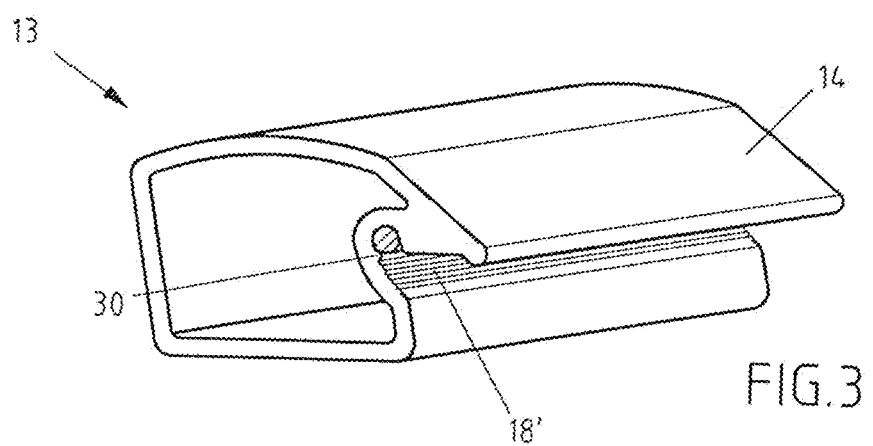

In FIG. 3, another form of the reflecting surface 18' is shown. The reflecting surface 18' can be textured. In this case, the reflecting surface 18' has a rippled surface, causing surface flaws to be retouched. Due to the peaks and valleys of the incorporated fluting, moreover, a high reflectivity and a wide dispersion of the incident light are achieved.

Figure 4:
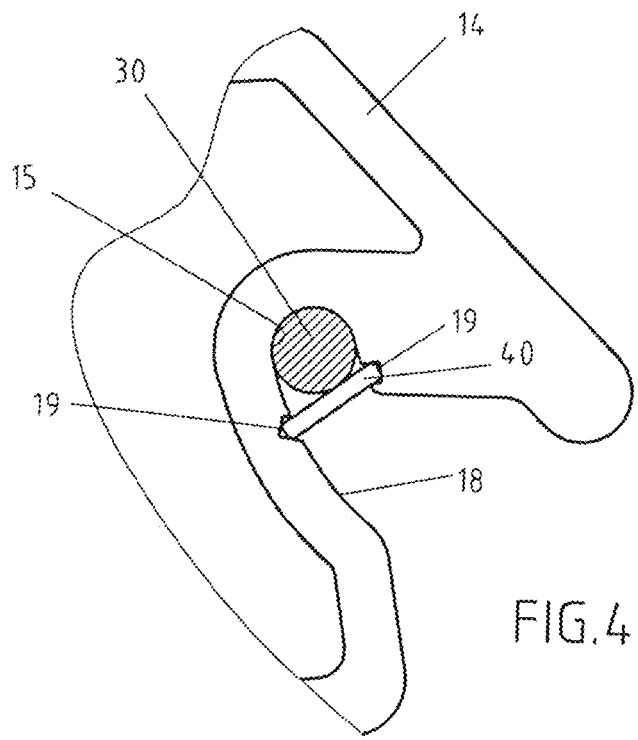

FIG. 4 shows another possibility for the arrangement of a lighting element 30 in a channel 15 behind the outer surface 14 of a profile element 10. In this case, the channel 15 has no constriction 17 in the region of the opening 16, but instead two retaining grooves 19. Inserted into these retaining grooves 19 is a diffusing lens 40.

This diffusing lens 40 covers the opening 16 of the channel 15 from the outside. A diffusing lens 40 of this nature preferably is made of Plexiglas, by which is meant polymethyl methacrylate (PMMA), that is at least partially translucent in order to allow the light rays of the lighting element to pass through. It can be frosted in order to achieve a particular dispersion, or colored in order to produce a desired light effect. Instead of using a diffusing lens 40, it would also be possible to cover the lighting element 30 in the channel 15 with a translucent resin.

Figure 5:
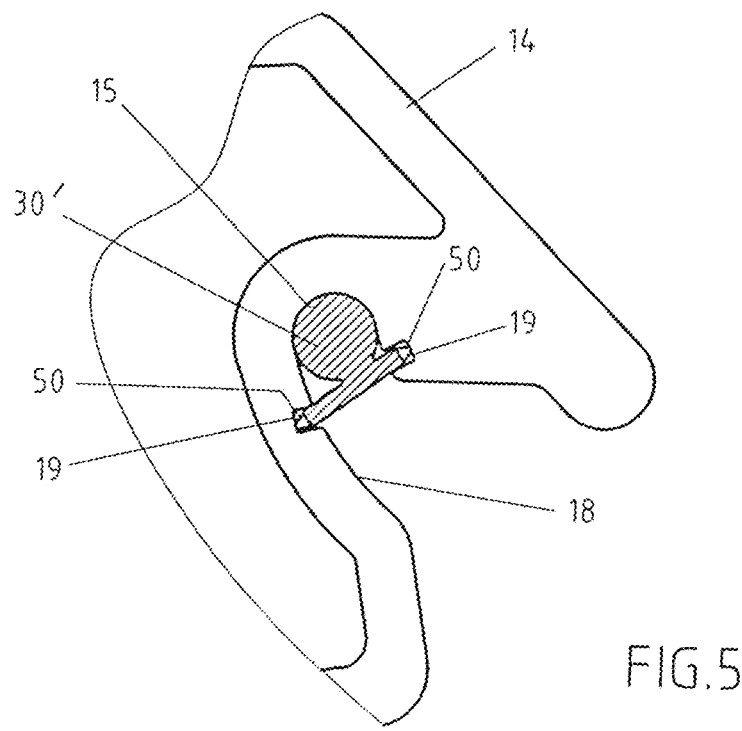

FIG. 5 shows another lighting element 30'. In this case, it is an optical waveguide in the form of an extruded component; such a component could also be produced through injection molding where appropriate. This lighting element 30' has an omega-shaped cross-section. The channel 15 is matched to this cross-section so that the curvature of the lighting element 30' is accommodated in the channel 15, and the base is held in the retaining grooves 19. In this case, seals 50 are additionally molded onto the two sides of the base in order to additionally protect the lighting element 30' from the effects of moisture. In this lighting element 30', the light is coupled into the ends of the part with the round cross-section, and the light passes to the outside through the base of the omega, then strikes the reflecting surface 18 and is deflected there so that it radiates laterally from the roof rack.

An injection molded component of this nature has the advantage that it can be inserted or snapped into the channel 15 with ease.

The arrangement of a lighting element 30 such that it is concealed behind an outer surface 14 of the profile element 10 is also possible with other motor vehicle components, such as, e.g., with a weather strip or other motor vehicle components. In order to achieve a special decorative effect, in addition the optical waveguide or the opening of the channel can be darkened or masked in sections, or the diffusing lens can be darkened, in order to obtain regions that are not illuminated. Moreover, multiple optical waveguides can be provided as lighting element 30, 30'. In the case of multiple optical waveguides, a third rack foot can also be provided, from where an additional coupling in of light takes place. In any case, the illumination takes place entirely indirectly, wherein the rays of light radiated by the lighting element 30 can be radiated to the outside by means of a reflecting surface 18, 18'. For this purpose, the reflecting surface 18, 18' of the profile element 10 is oriented toward the applicable vehicle outer surface.

LIST OF REFERENCE CHARACTERS 10 profile element
11 front profile end region
12 back profile end region
13 center profile region
14 outer surface
15 channel (arranged so as to be concealed)
16 channel opening
17 constriction
18, 18' reflecting surface
19 retaining groove
20, 21 mounting adapters
22 screws
30, 30' lighting element
40 diffusing lens
50 seals

The invention claimed is:

1. A motor vehicle component,
including a metal profile element (10) having a front profile end region (11), a back profile end region (12) and a center profile region (13) extending between the profile end regions (11, 12), the metal profile element (10) having a longitudinal direction, and
including a lighting element (30) for producing a strip of light radiating in the longitudinal direction of the profile element (10),
wherein the profile element (10) has a channel (15) extending in the longitudinal direction of the profile element (10), in which the lighting element (30) is held,
wherein the channel (15) has an externally accessible opening (16) extending in the longitudinal direction of the profile element (10),
characterized in that the channel (15) with the lighting element (30) is arranged so as to be concealed behind an outer surface (14) of the profile element (10),
in that a reflecting surface (18, 18') is located on the profile element (10) adjacent the opening (16) of the channel (15), wherein the reflecting surface (18, 18') is oriented at such an angle that rays of light emitted by the lighting element (30) directly strike the reflecting surface (18, 18') and are directly radiated out of the profile element (10), and
in that the reflecting surface (18, 18') has a width that is greater than the width of the opening (16) of the channel (15),
further characterized in that the reflecting surface is corrugated, the corrugation produced during extrusion of the profile element, peaks and valleys of the corrugation extending longitudinally.

2. The motor vehicle component according to claim 1, characterized in that the emitted rays of light of the lighting element (30) first strike the reflecting surface (18, 18') of the profile element (10) before the rays of light are radiated outward at right angles to the outer surface (14).

3. The motor vehicle component according to claim 2, characterized in that the emitted rays of light of the lighting element (30) strike more than one reflecting surface (18, 18') of the profile element (10) before they are radiated outward.

4. The motor vehicle component according to claim 2, characterized in that the reflecting surface (18) has a smooth surface.

5. The motor vehicle component according to claim 1, characterized in that the reflecting surface (18') has a textured surface.

6. The motor vehicle component according to claim 1, characterized in that the emitted rays of light of the lighting element (30) strike more than one reflecting surface (18, 18') of the profile element (10) before they are radiated outward.

7. The motor vehicle component according to claim 1, characterized in that the reflecting surface (18) has a smooth surface.

8. The motor vehicle component according to claim 2, characterized in that the reflecting surface (18') has a textured surface.

9. The motor vehicle component according to claim 1, characterized in that the channel (15) is matched to the cross-section of the lighting element (30), and the channel (15) holds the lighting element (30).

10. The motor vehicle component according to claim 1, characterized in that the channel (15) has a round, oval, rectangular, or other polygonal cross-section.

11. The motor vehicle component according to claim 1, characterized in that the lighting element (30) is an optical waveguide, wherein the light is injected at one or both ends of the optical waveguide by light-emitting diodes, wherein the light-emitting diodes are arranged in one or both profile end regions (11, 12).

12. The motor vehicle component according to claim 1, characterized in that the lighting element (30) is an electroluminescent cord, wherein an inverter is placed in the profile end region (11, 12).

13. The motor vehicle component according to claim 12, characterized in that the inverter is located outside of the profile element (10), wherein the inverter is connected to additional electroluminescent cords.

14. The motor vehicle component according to claim 1, characterized in that an at least partially translucent diffusing lens (40) is provided in front of the opening (16) of the channel (15), in which the diffusing lens (40) covers the opening (16) from the outside, wherein the diffusing lens (40) is held in retaining grooves (19) on the profile element (10).

15. The motor vehicle component according to claim 14, characterized in that the diffusing lens (40) is made of frosted or colored polymethyl methacrylate (PMMA).

16. The motor vehicle component according to claim 1, characterized in that the lighting element (30) in the channel (15) is covered by a translucent resin.

17. The motor vehicle component according to claim 1, characterized in that the metal profile element (10) has a hollow profile and takes the form of a roof rack, wherein adapters (20, 21) for mounting the metal profile element (10) are provided in the front profile end region (11) and in the back profile end region (12), and wherein the light of the lighting element (30) is deflected from the reflecting surface (18, 18') such that it is radiated laterally from metal profile element (10).

18. The motor vehicle component according to claim 17, characterized in that the front profile end region (11) and the back profile end region (12) are bent with respect to the center profile region (13) of the metal profile element (10) so that the result is a roof rack raised on fixed supports.

19. The motor vehicle component according to claim 1, characterized in that the metal profile element (10) has the form of a weather strip, wherein the lighting element (30) is located behind the outer surface (14), and radiates light downward where the light is deflected outward by the reflecting surface (18, 18').

20. A method for use with an apparatus, comprising:
   a metal profile element (10) having a front profile end region (11), a back profile end region (12) and a center profile region (13) extending between the profile end regions (11, 12), the metal profile element (10) having a longitudinal direction, and
   including a lighting element (30) for producing a strip of light radiating in the longitudinal direction of the profile element (10),
   wherein the profile element (10) has a channel (15) extending in the longitudinal direction of the profile element (10), in which the lighting element (30) is held,
   wherein the channel (15) has an externally accessible opening (16) extending in the longitudinal direction of the profile element (10),
   characterized in that the channel (15) with the lighting element (30) is arranged so as to be concealed behind an outer surface (14) of the profile element (10),
   in that a reflecting surface (18, 18') is located on the profile element (10) adjacent the opening (16) of the channel (15), wherein the reflecting surface (18, 18') is oriented at such an angle that rays of light emitted by the lighting element (30) directly strike the reflecting surface (18, 18') and are directly radiated out of the profile element (10), and
   in that the reflecting surface (18, 18') has a width that is greater than the width of the opening (16) of the channel (15),
   the profile element further characterized in that the reflecting surface is corrugated, the corrugation produced during extrusion of the profile element,
   peaks and valleys of the corrugation extending longitudinally,
   the method comprising the steps of providing power to the lighting element (30),
   having the rays of light strike the reflecting surface (18, 18'),
   and the rays of light being radiated out of the profile element (10).

* * * * *